United States Patent
Kuo et al.

(10) Patent No.: US 10,830,594 B2
(45) Date of Patent: Nov. 10, 2020

(54) UPDATING MISSING ATTRIBUTES IN NAVIGATIONAL MAP DATA VIA POLYLINE GEOMETRY MATCHING

(71) Applicant: MITAC INTERNATIONAL CORP., Taoyuan (TW)

(72) Inventors: Juhang Kuo, San Dimas, CA (US); Ilya Krukov, San Dimas, CA (US); Ilya Antonenko, San Dimas, CA (US)

(73) Assignees: MITAC INTERNATIONAL CORP., Taoyuan (TW); MiTAC Research (Shanghai) Ltd., Shanghai (CN)

(*) Notice: Subject to any disclaimer, the term of this patent is extended or adjusted under 35 U.S.C. 154(b) by 288 days.

(21) Appl. No.: 15/803,858

(22) Filed: Nov. 6, 2017

(65) Prior Publication Data

US 2019/0137283 A1    May 9, 2019

(51) Int. Cl.
*G01C 21/32* (2006.01)
*G09B 29/10* (2006.01)
*G09B 29/00* (2006.01)
*G06F 16/29* (2019.01)

(52) U.S. Cl.
CPC ............ *G01C 21/32* (2013.01); *G06F 16/29* (2019.01); *G09B 29/004* (2013.01); *G09B 29/106* (2013.01)

(58) Field of Classification Search
CPC .... G01C 21/32; G09B 29/004; G09B 29/106; G06F 16/29
See application file for complete search history.

(56) References Cited

U.S. PATENT DOCUMENTS

2010/0082248 A1* 4/2010 Dorum .................. G01C 21/32
701/533

* cited by examiner

*Primary Examiner* — Nga X Nguyen
(74) *Attorney, Agent, or Firm* — Winston Hsu (57) ABSTRACT

A method of updating navigational map data with missed attributes via polyline geometry matching includes obtaining first and second navigational map data sets. Chains are built of original road elements of the first navigational map data and chains are built of original road elements of the second navigational map data set. A spatial index of the chains is created. A set of chain candidates that are within a predetermined distance of each other is created according to the spatial index. The size of the set of chain candidates is reduced utilizing an angle filter. Each remaining chain candidate of the reduced set of chain candidates is ranked and the chain candidate having a best ranking is selected as the best candidate chain. The first navigational map data set is updated utilizing attributes from the best candidate chain.

14 Claims, 10 Drawing Sheets

Root-just bbox of layer

Level 1

Level 2

Level 3

Level 4

Cells

UPDATING MISSING ATTRIBUTES IN NAVIGATIONAL MAP DATA VIA POLYLINE GEOMETRY MATCHING

BACKGROUND OF THE INVENTION

1. Field of the Invention

The application relates to navigational map data, and particularly to updating missing attributes in navigational map data from one data set using attributes from another dataset via polyline geometry matching.

2. Description of the Prior Art

The problem of enhancement of map data from different sources is rather complicated. It is necessary to find objects from different vendors with similar geometry to use the attributes for enhancement of data. Due to enormous data size, it is impossible to compare geometry for all entries, because it will take unacceptable time.

SUMMARY OF THE INVENTION

A method of updating navigational map data with missed attributes via polyline geometry matching is proposed. The method includes obtaining a first navigational map data set to be updated and a second navigational map data set different from the first navigational map data set. Chains are built of original road elements of the first navigational map data and chains are built of original road elements of the second navigational map data set. A spatial index of the chains is created. A set of chain candidates that are within a predetermined distance of each other is created according to the spatial index. The size of the set of chain candidates is reduced utilizing an angle filter. Each remaining chain candidate of the reduced set of chain candidates is ranked and the chain candidate having a best ranking is selected as the best candidate chain. The first navigational map data set is updated utilizing attributes from the best candidate chain.

In some embodiments, the chains of original road elements may be built by calculating polylines according to the original road elements, combining connecting polylines, and breaking the connecting polylines at crossroads to form the chains. In some embodiments, the spatial index of the chains may be generated by forming bounding boxes around each chain and utilizing an R-Tree spatial structure that splits space corresponding to the chains into hierarchically nested bounding boxes. In some embodiments, the set of chain candidates that are within a predetermined distance of each other according to the spatial index may be created by forming a set of chains whose bounding boxes are at a same layer and share a common parent bounding box according to the spatial index. In some embodiments, the size of the set of chain candidates is reduced utilizing an angle filter. In some embodiments, each remaining chain candidate of the reduced set of chain candidates may be ranked by calculating distance between a target polyline and ends of each chain and ranking each chain according to the distance to determine the best candidate chain.

A computer comprising a case, a processor within the case, and a non-transitory memory within the case and coupled to the processor is also proposed, where the memory comprises computer code, which when executed by the processor, actualizes the above method.

These and other objectives of the present invention will no doubt become obvious to those of ordinary skill in the art after reading the following detailed description of the preferred embodiment that is illustrated in the various figures and drawings.

DETAILED DESCRIPTION

The present invention provides a method of calculating and updating attributes missing in one dataset, using attributes from another dataset. If data have good geometry but poor additional information, it may be a good idea to fill missed attributes using attributes from the different dataset. This process may be tricky because geometry from different sources rarely match well.

To overcome the problem of enhancement of digital map data to include missing attributes from different sources taking an unacceptable amount of time, the present application reduces the number of necessary comparisons by avoiding comparison of definitely different objects.

Figure 1:
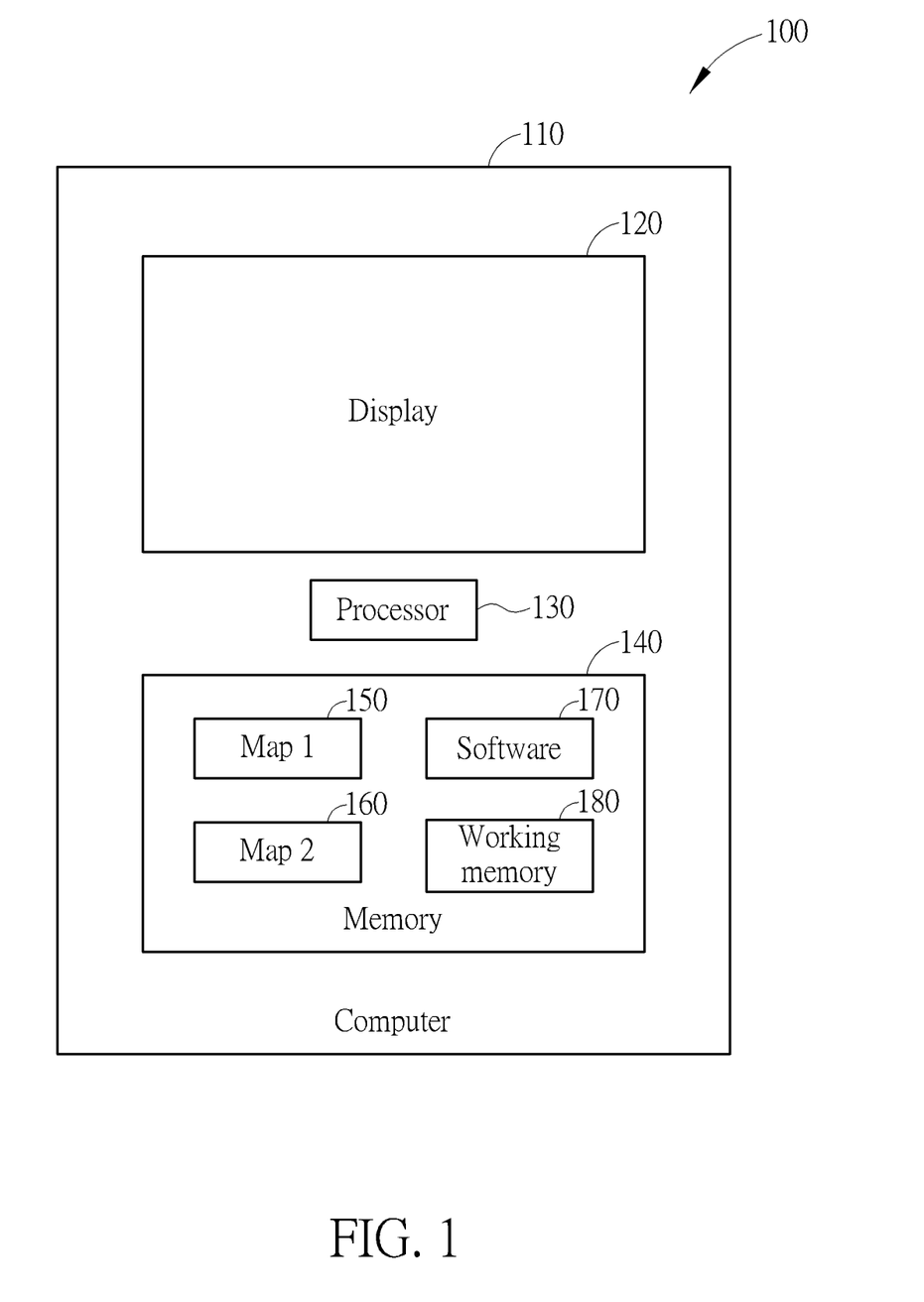
FIG. 1 is a functional block diagram of a computer configured to update missing attributes in navigational map data via polyline geometry matching.

To accomplish this goal, the inventor has developed the following algorithm, which may be implemented on a computer 100 shown in FIG. 1. The computer 100 may comprise a case 110, a display 120, a processor 130, and a memory 140. The memory 140 may comprise stored map 1 data 150, stored map 2 data 160, software 170 configured to implement the method as described below, and a working memory 180.

First, map geometry data from different venders is obtained and stored in a memory, preferably a memory 140 of the device 110 enhancing the map data. A processor 130 of the device 110 then divides all geometry data for each map into special zones and compares objects only within the same zone corresponding to each map. This division of map data into zones and only working with data within one zone not only greatly reduces computational workload, but also facilitates updating of data in zones frequently needing updating.

The effect of dividing geometry data for each map into special zones is normally dependent upon data size. The larger the data set making up the map geometry data from the venders, the more pronounced the computational speedup would be if divided into special zones. In a typical task, using a brute-force approach that does not divide the data set into special zones in this manner may require up to 10-15 times as much processing as needed when the data set is divided into these special zones.

This division may be done in many ways, but the simplest is just to select a region that is a proper subset of the map data. One of the special zones from Map 1 is generated from a first data set and the corresponding special zone from Map 2 is generated from a second and different data. The following steps can then be applied to each of the special zones as needed.

First, chains of original data elements are built to reduce the number of comparisons. To do this, objects, such as roads, are considered as polyline objects. The provider of the respective map geometry data usually provides the polylines. Connected polylines are combined chains. Initially, a chain consists of a single polyline. For each end of the single polyline chain, the method checks if there is only one incident polyline. Two polylines are considered incident if they share start or end vertices.

Figure 2:
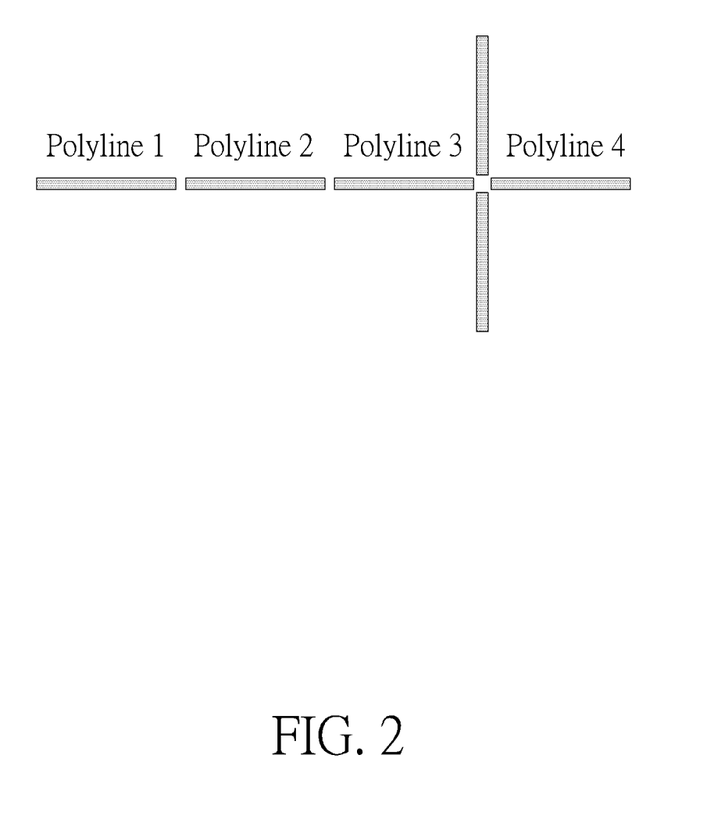
FIG. 2 illustrates possible chain construction using polylines.

If there is not only one incident polyline (due to a crossroad, no incident polyline, etc.), then stop building the chain in this direction. If there is only one incident polyline, optionally the correspondence of some attributes can be checked. For example, for a road network it is usually good idea to check if allowed driving directions for the current chain and polyline match. If the attributes do match, the incident polyline is added to the chain. If the attributes do not match, the incident polyline may not be added to the chain in embodiments that utilize this option. If there is only one incident polyline and the correspondence of some attributes are not checked, then the incident polyline is added to the chain. In either case, the most distant end of the added polyline now is considered the end of the chain and the process of checking if there is only one incident polyline is repeated. This entire process repeats until the chain can grow no further. FIG. 2 shows some connected polylines as an example. In FIG. 2, polyline 1, polyline 2, and polyline 3 form one chain, and polyline 4 starts a second chain due to the intersection.

The benefit of using chains instead of individual objects is roughly proportional to average chain length due to the number of chains that require comparison being less that the number of individual objects that would require comparison. For example, depending upon the data, suppose that the average chain contains 2-3 initial objects. In this example, using chains speeds up execution 2-3 times. Longer average chain length results in even greater the computational speedup. As a general rule of thumb, chain length, and thus the speed-up effect, is lesser in dense areas of the map and greater in sparse areas of the map, but in either case is almost universally faster than comparison of individual objects.

Next a spatial index is formed. A spatial index is the structure that allows finding of neighbor chains quickly. Preferably, an R-Tree spatial index structure is used to split the space into hierarchically nested bounding boxes and allow determination of all neighbor chains fast with necessary accuracy.

Figure 3:
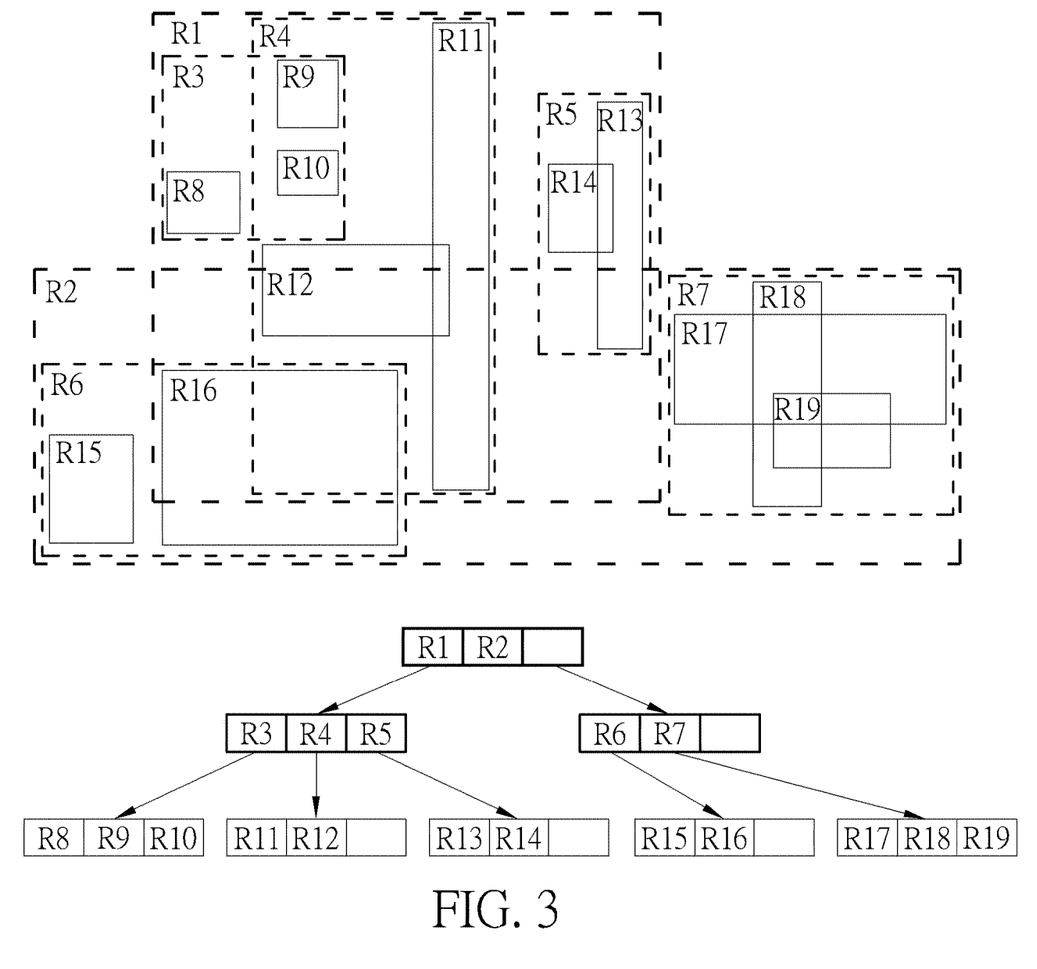
FIG. 3 illustrates creation of an R-Tree spatial index structure used to split the space into hierarchically nested bounding boxes and allow determination of all neighbor chains.
Figure 4:
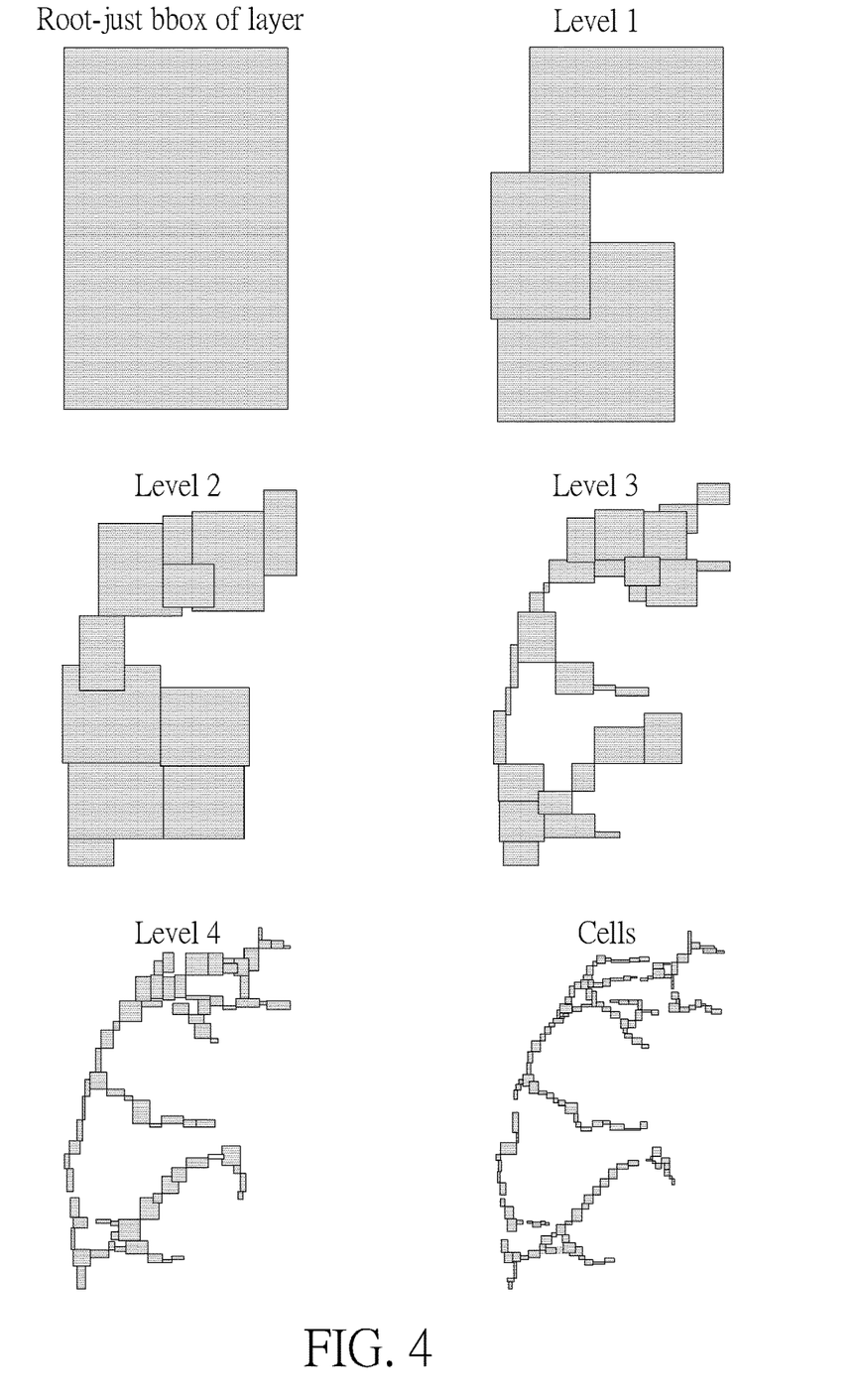
FIG. 4 illustrates an example of quasi-actual space splitting using the R-Tree method.

FIG. 3 illustrates use of the R-Tree structure, where each leaf of the R-Tree structure contains a chain. A bounding box surrounds each chain. Then new bounding boxes are formed that include nearby leaf bounding boxes. In turn, these new bounding boxes are also grouped according to proximity by a higher level of bounding boxes. The process continues grouping lower level bounding boxes into higher level bounding boxes according to design considerations. In FIG. 3, example leaf bounding boxes, positioned relative to the special zone, for each bounding box R1-R19 are shown. The leaf bounding boxes are grouped as described above with all levels of the structure placed into the R-Tree, also as shown in FIG. 3. In the example, the bounding boxes R1 and R2 enclose all other bounding boxes R3-R19 so are considered root level bounding boxes. The largest bounding boxes within R1 are R3, R4, and R5 so bounding boxes R3, R4, and R5 are considered level two bounding boxes with R1 as their parent. Bounding boxes R8, R9, and R10 are level three bounding boxes with R3 as their parent. The remainder of the R-Tree is filled out similarly. FIG. 4 illustrates an example of quasi-actual space splitting using the R-Tree method, showing how the area enclosed by a bounding box gets smaller and details gets finer at as you go down in levels.

For each object, the set of neighboring chains is selected which could be good candidates for attribute transfer. To choose the set of candidates, bounding boxes in the leaf layer with the same parent in the spatial index for the respective data sets can be used. For example, FIG. 3 shows that chains within the bounding boxes R8, R9, and R10 would form a set of candidates due to their proximity in the spatial index R-Tree. Chains within the bounding boxes R11 and R12 would form another set of candidates, etc.

Next, an angle filter may be used to reduce the size of the set of candidates. Angles between target polylines and each subchain from candidate chains in a set are compared. To do this, a straight line is drawn connecting the ends of the target polyline and another straight line is drawn connecting the ends of each subchain and of the candidate chain. These lines are used to calculate the angles. In a case where an angle between the polyline and some subchain is less than a first predetermined angle, the chain is saved as a candidate. If the angle is not less than the first predetermined angle, the chain is removed from the set of candidates. If a subchain (or polyline) is not straight, meaning it may include more than one polyline that are not necessarily parallel; an angle between lines which goes through start and end of the polyline portions is calculated. The angle between a first line connecting the start and end of polyline 1 and a second line connecting the start and end of polyline 2 is calculated. When the calculated angle is greater than a second predetermined angle, the chain does not match and is excluded from the set of candidates.

Figure 5:
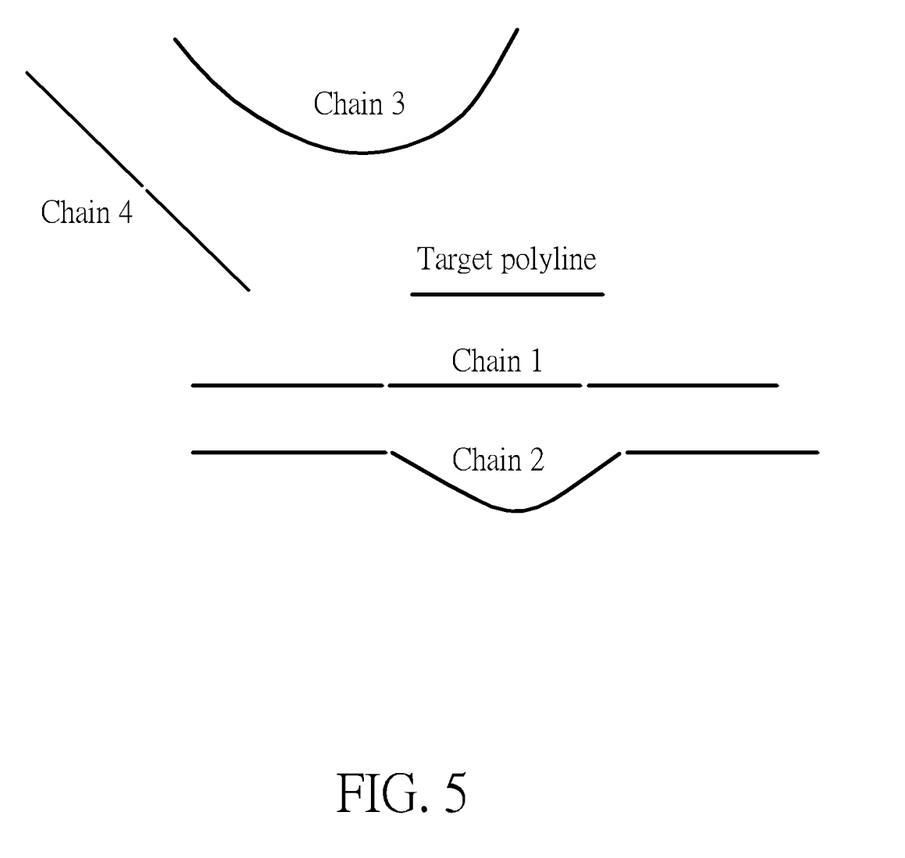
FIG. 5 shows examples of chains to be compared to a target polyline.

FIG. 5 shows example results of chains 1-4 being compared to a target polyline. In FIG. 5, Chain 1 includes three polylines arranged more or less as a straight line. Chain 2 includes three polylines and is also considered a more or less straight line because even though the polyline in the center of chain 2 is curved, only the ends of the center polyline are used to form the line used to calculate the angles. Chain 3 includes a single curved polyline, so a line drawn between the endpoints of the polyline is used to form the line used to calculate the angles. Chain 4 includes two polylines arranged more or less as a straight line.

A result of the comparison of the angles, chains 1, 2, and 3 pass the angle filter while chain 4 does not pass the angle filter and is excluded from set of candidates. Angle comparison between ends of polylines\chains allows filtering out of unsuitable candidates.

In testing, use of the angle filter provided a 40%-50% speedup in processing compared to a version of this method that does not use the angle filter.

Now the best candidate for an object can be selected from the remaining set of candidates. The best way is to create some kind of ranking for candidates and then choose candidate with best rank.

Rankings may be determined according to the calculated distance, with the lower the distance, the lower (meaning better) the rank. The intuition behind such ranking calculation is that a smaller rank corresponds to closer objects. A subchain with low enough rank is considered as good candidate for attribute transfer. The chain with the lowest (best) rank is selected from the set of candidates for attribute transfer.

Figure 6:
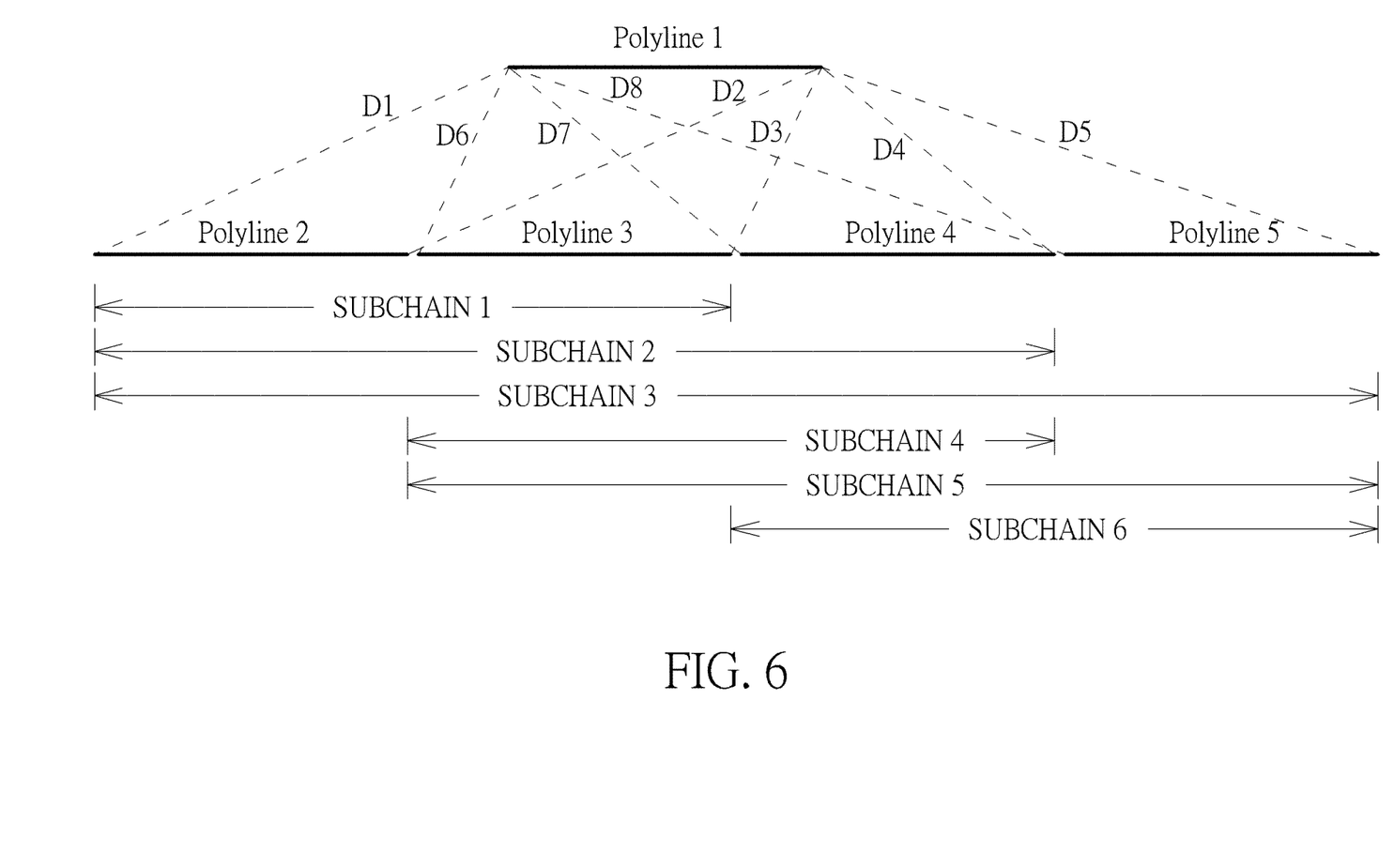
FIG. 6 illustrates calculating the distance between ends of a target polyline and ends of a chain and the distance between the target polyline and all subchains from chain.

To assign rank to candidates, the following method often yields the best results. Calculate the distance between ends of a target polyline and ends of chain from the set of candidates and calculate the distance between the target polyline and all subchains from chain. FIG. 6 illustrates this feature showing a polyline 1 and a chain of polylines 2-5. The possible pairings that are calculated include p1-p2; p1-p3; p1-p4; p1-p5; p1-(subchain)p2,p3; p1-(subchain)p3,p4; p1-(subchain)p4,p5; p1-(subchain)p2,p3,p4; p1-(subchain)p3,p4,p5; p1-(subchain)p2,p3,p4,p5.

In the example of FIG. 6, when calculating the distance between polyline 1 and subchain 1, the distance D1 is added to the distance D3 (D1 is the distance between the start of polyline 1 and the start of subchain 1, D3 is the distance between the end of polyline 1 and the end of subchain 1). Similarly, the distance between polyline 1 and subchain 5 equals D6+D5, between polyline 1 and subchain 6 equals D7+D5, etc. If D1+D3 is smaller than D6+D5, than the comparison of polyline 1 and subchain 1 receives a lower (better) rank than does the comparison between polyline 1 and subchain 5.

To speed up comparisons for distance, it is preferred that individual polylines not be compared, rather a subchain is used as the basic comparison element, where a subchain comprises at least two polylines. Subchains are used in the comparisons because the subchains frequently permit finding a better best candidate case than does mere comparisons of long chains comprised of plural subchains. Comparing only ends (and not midpoints) of polylines\chains allows resolution of difficult situations, such as when roads in the different data sets have different geometries.

Figure 7:
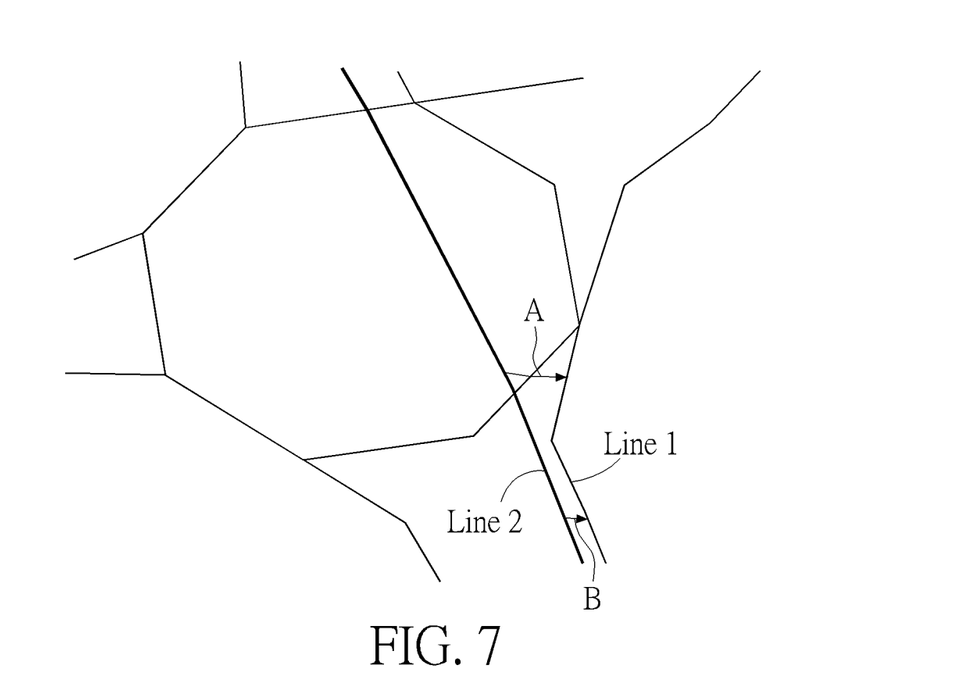
FIGS. 7 and 8 illustrate how comparing only ends of polylines/chains help resolve situations when roads have very different geometry.

FIG. 7 shows an example portion of a map where line 1 and line 2 start out close together having the distance between them shown as arrow B, then grow farther apart, shown as arrow A. If comparing individual polylines in this case, it is very difficult to determine correctly whether line 1 and line 2 are really the same thing. The two portions of lines 1 and 2 between arrow B are in similar angle and may not be filtered out, but if considering the whole line of lines 1 and 2, the angle filter will work well. A comparison of lines respectively connecting the endpoints of line 1 with the endpoints of line 2 simplifies the situation. In this example, such a comparison may reveal too great of an angle between the lines to be considered a good candidate for a match.

Figure 8:
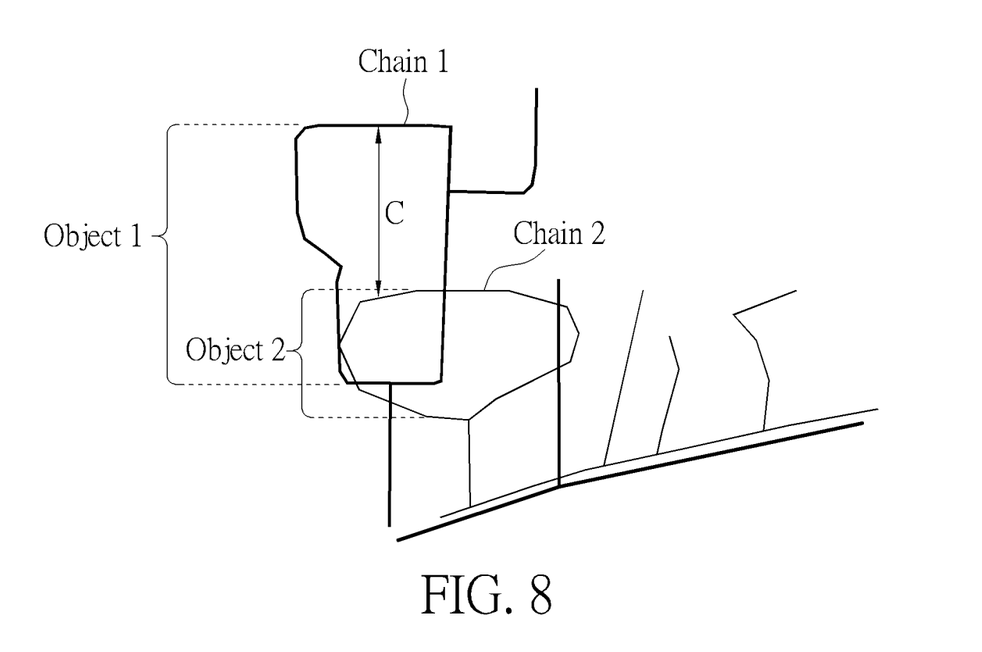

FIG. 8 shows another example where it may be difficult to determine whether object 1 and object 2 are really the same thing. As the distance C between the ends of chain 1 and chain 2 may be greater than desired for accuracy's sake, these two chains may not be considered a good candidate for a match.

In addition, vertex degree may also be used in some embodiments to further filter or select candidates, either before or after ranking. Vertex degree is the count of polylines incident on a particular vertex.

Two different types of attributes can be considered during transfer. The first type is a discrete attribute belonging to the whole chain. Examples of a discrete attribute are type of road, driving direction, etc. The second type of attribute is one that is distributed along the chain, for example an address interval.

Figure 9:
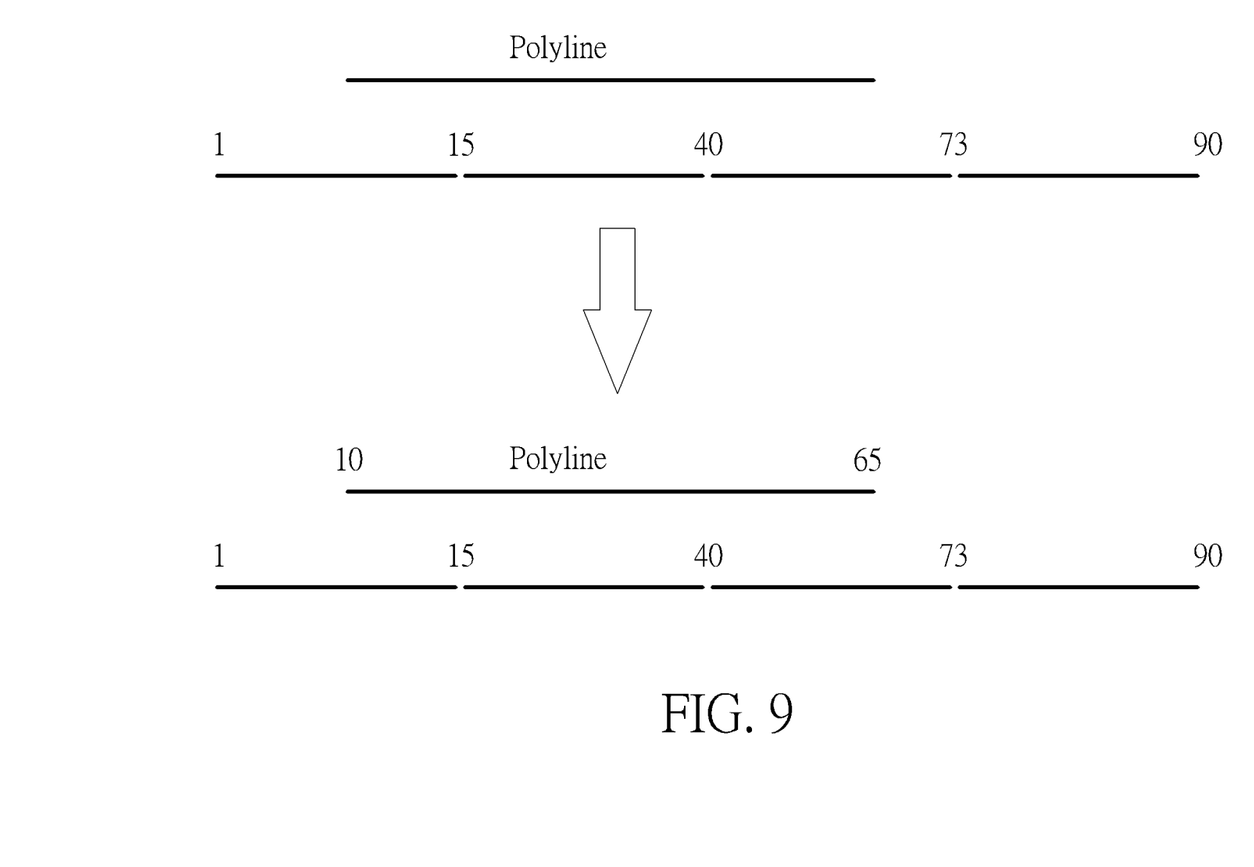
FIG. 9 illustrates moving the attribute by considering only the interval of attributes that correspond to the target geometry.

Transferring a discrete attribute is trivial, but to transfer correctly a distributed attribute special care is needed. To transfer correctly a distributed attribute it is necessary to select the best-matching subchain. Note that this subchain may include a fraction of a polyline. If the best chain is longer than the polyline, attributes cannot be moved as is. To move the attribute correctly it may be necessary to consider only interval of attributes that corresponds to the target geometry. FIG. 9 illustrates this situation where only attributes in the interval 10-65 of the chain correspond to the polyline, which also has the interval 10-65.

Figure 10:
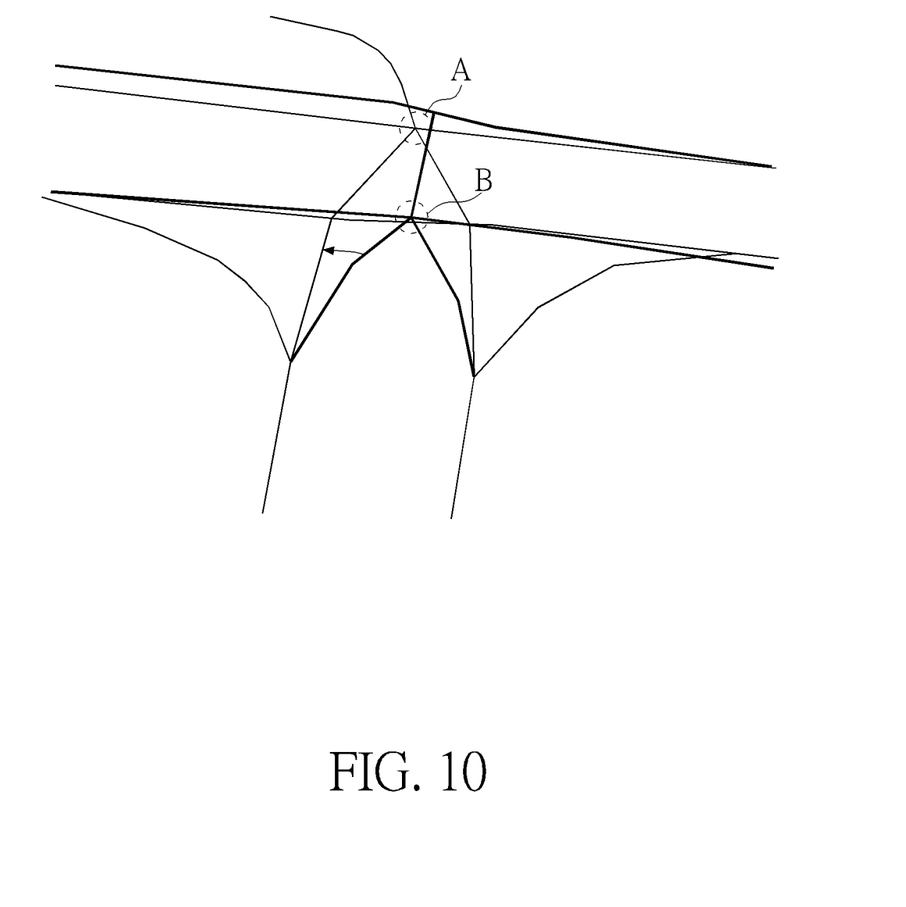
FIG. 10 illustrates using information about incidents to identify crossroads correctly.

The ends of chain require special care and information about incidence on crossroads can be used to move attributes correctly. Different data providers have different geometries of same roads. Sometimes the best chain is longer than the target polyline (as shown in FIG. 9), but the chain has crossroads with the same incidence on the ends. For example, FIG. 10 shows two geometries of an area. In the drawing, there are two different triangle-like portions that look similar but may not match directly due to the different geometries. However, the top vertex A of one of the portions and the top vertex B of the other portion share similar vertex degrees and along with other factors such as polyline angles can be used to make the assumption that the two vertices are really the same single vertex. This situation allows identification of the same crossroads in the different data sets and the attribute interval does not need to be reduced like illustrated in FIG. 9.

Figure 11:
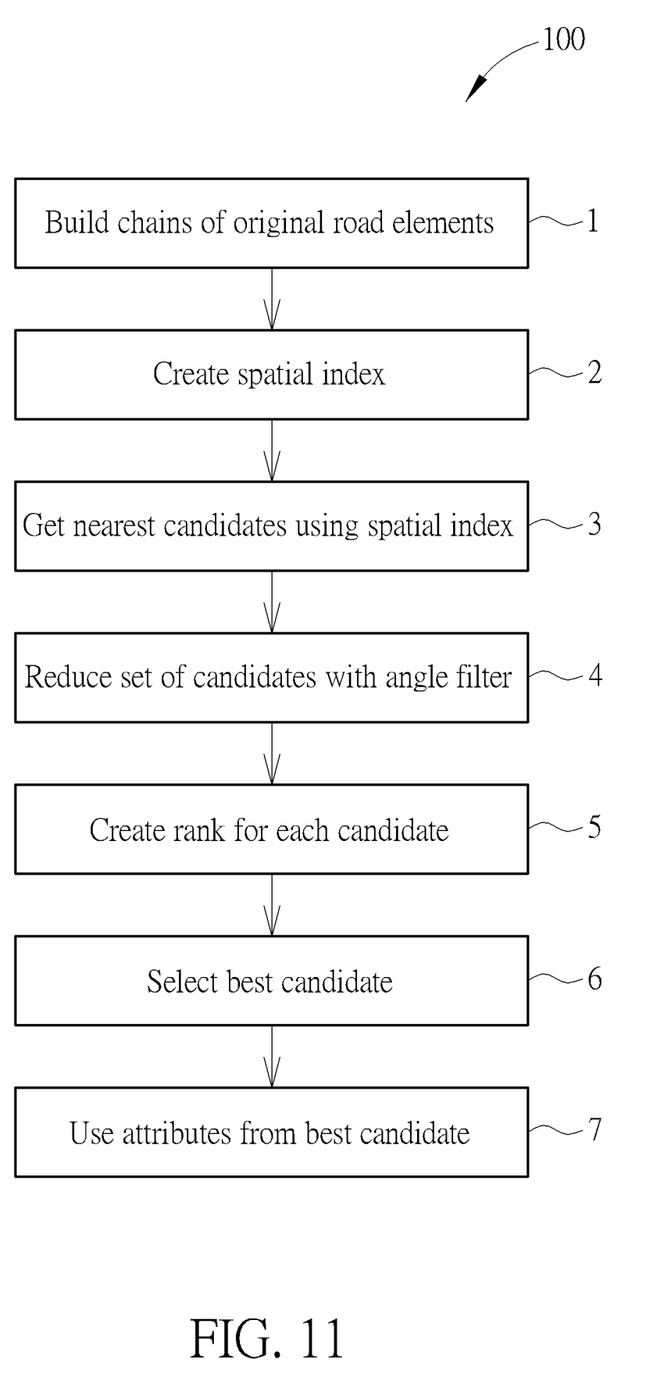
FIG. 11 illustrates a flow chart 100 for updating missing attributes in navigational map data from one dataset using attributes from another dataset via polyline geometry matching.

FIG. 11 illustrates a flow chart 100 for updating missing attributes in navigational map data from one dataset using attributes from another dataset via polyline geometry matching. FIG. 11 includes the following steps.

Step 1: Build chains of original road elements.
Step 2: Create spatial index.
Step 3: Get set of candidates using spatial index.
Step 4: Reduce set of candidates with angle filter.
Step 5: Create rank for each candidate.
Step 6: Select best candidate.
Step 7: Use attributes from best candidate.

As claimed, the present application offers a distinct advantage of speed to the technical field of map updating using topologically different map data from different sources. The advantage in speed is achieved by getting sets of neighbor candidates that are within a predetermined distance of each other via use of a spatial index of chains of the original elements. Unsuitable candidates are removed from sets of candidates with an angle filter to reduce further computational complexity. Remaining candidates are then ranked and the highest-ranking candidate is selected for attribute transfer.

In short, calculation of missed attributes via polyline geometry matching with road geometry from different sources as described herein quickly produces an updated, more complete, and more accurate digital map which can provide up-to-date map and attribute data to smartphone owners and users of other navigational devices.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method of updating navigational map data with missed attributes via polyline geometry matching, the method comprising:
   obtaining a first navigational map data set to be updated and a second navigational map data set different than the first navigational map data set;
   building chains of original road elements of the first navigational map data and chains of original road elements of the second navigational map data set;
   creating a spatial index of the chains by forming bounding boxes around each chain and utilizing an R-Tree spatial structure that splits space corresponding to the chains into hierarchically nested bounding boxes;
   creating a set of chain candidates that are within a predetermined distance of each other according to the spatial index by forming a set of chains whose bounding boxes are at a same layer and share a common parent bounding box according to the spatial index;
   reducing size of the set of chain candidates utilizing an angle filter;
   ranking each remaining chain candidate of the reduced set of chain candidates;
   selecting the remaining chain candidate having a best ranking as best candidate chain; and
   updating the first navigational map data set utilizing attributes from the best candidate chain.

2. The method of claim 1 wherein building chains of original road elements of comprises calculating polylines according to the original road elements, combining connecting polylines, and breaking the connecting polylines at crossroads to form the chains.

3. The method of claim 1 wherein reducing the size of the set of chain candidates utilizing an angle filter comprises, for each chain in the set of chain candidates, comparing a target polyline and each subchain from said each chain, when an angle between the target polyline and a subchain is greater than a predetermined angle, removing said each chain from the set of chain candidates.

4. The method of claim 3, further comprising calculating the angle between the target polyline and the subchain by calculating an angle between lines going through start and end points of each polyline in the subchain when the subchain is not straight.

5. A computer comprising:
   a case;
   a processor within the case;
   a non-transitory memory within the case and coupled to the processor, the memory comprising:
      a first navigational map data set to be updated and a second navigational map data set different than the first navigational map data set; and
      computer code that when executed by the processor updates attributes missing in the first navigational map data set according to the following method:
         building chains of original road elements of the first navigational map data and chains of original road elements of the second navigational map data set;
         creating a spatial index of the chains by forming bounding boxes around each chain and utilizing an R-Tree spatial structure that splits space corresponding to the chains into hierarchically nested bounding boxes;
         creating a set of chain candidates that are within a predetermined distance of each other according to the spatial index by forming a set of chains whose bounding boxes are at a same layer and share a common parent bounding box according to the spatial index;
         reducing size of the set of chain candidates utilizing an angle filter;
         ranking each remaining chain candidate of the reduced set of chain candidates;
         selecting the remaining chain candidate having a best ranking as best candidate chain; and
         updating the first navigational map data set utilizing attributes from the best candidate chain.

6. The computer of claim 5 wherein the computer code, when executed by the processor, further builds the chains of original road elements by calculating polylines according to the original road elements, combining connecting polylines, and breaking the connecting polylines at crossroads to form the chains.

7. The computer of claim 5 wherein the computer code, when executed by the processor, further reduces the size of the set of r chain candidates utilizing an angle filter by, for each chain in the set of chain candidates, comparing a target polyline and each subchain from said each chain, and when an angle between the target polyline and a subchain is greater than a predetermined angle, removing said each chain from the set of chain candidates.

8. The computer of claim 7 wherein the computer code, when executed by the processor, further calculates the angle between the target polyline and the subchain by calculating an angle between lines going through start and end points of each polyline in the subchain when the subchain is not straight.

9. A method of updating navigational map data with missed attributes via polyline geometry matching, the method comprising:
   obtaining a first navigational map data set to be updated and a second navigational map data set different than the first navigational map data set;
   building chains of original road elements of the first navigational map data and chains of original road elements of the second navigational map data set;
   creating a spatial index of the chains;
   creating a set of chain candidates that are within a predetermined distance of each other according to the spatial index;
   reducing size of the set of chain candidates utilizing an angle filter;
   ranking each remaining chain candidate of the reduced set of chain candidates by calculating distance between a target polyline and ends of each chain in the reduced set of chain candidates and calculating distance between a target polyline and ends of each subchain in the reduced set of chain candidates and ranking each chain in the reduced set of chain candidates according to the distance to determine the best candidate chain;
   selecting the remaining chain candidate having a best ranking as best candidate chain; and
   updating the first navigational map data set utilizing attributes from the best candidate chain.

10. The method of claim 9 wherein updating the first navigational map data set navigational map data set utilizing attributes from the best candidate chain comprises only updating attributes in an interval of attributes that corresponds to target polyline geometry.

11. The method of claim 9 wherein updating the first navigational map data set navigational map data set utilizing attributes from the best candidate chain comprises updating attributes in an interval of attributes from the best candidate chain when the best candidate chain is longer than the target polyline and has a crossroad with same incidence on the ends of the best candidate chain and the target polyline.

12. A computer comprising:
a case;
a processor within the case;
a non-transitory memory within the case and coupled to the processor, the memory comprising:
  a first navigational map data set to be updated and a second navigational map data set different than the first navigational map data set; and
  computer code that when executed by the processor updates attributes missing in the first navigational map data set according to the following method:
    building chains of original road elements of the first navigational map data and chains of original road elements of the second navigational map data set;
    creating a spatial index of the chains;
    creating a set of chain candidates that are within a predetermined distance of each other according to the spatial index;
    reducing size of the set of chain candidates utilizing an angle filter;
    ranking each remaining chain candidate of the reduced set of chain candidates by calculating distance between a target polyline and ends of each chain in the reduced set of chain candidates, calculating distance between a target polyline and ends of each subchain in the reduced set of chain candidate, and ranking each chain in the reduced set of chain candidates according to the distance to determine the best candidate chain;
    selecting the remaining chain candidate having a best ranking as best candidate chain; and
    updating the first navigational map data set utilizing attributes from the best candidate chain.

13. The computer of claim 12 wherein the computer code, when executed by the processor, further updates the first navigational map data set navigational map data set utilizing attributes from the best candidate chain by only updating attributes in an interval of attributes that corresponds to target polyline geometry.

14. The computer of claim 12 wherein the computer code, when executed by the processor, further updates the first navigational map data set navigational map data set utilizing attributes from the best candidate chain by updating attributes in an interval of attributes from the best candidate chain when the best candidate chain is longer than the target polyline and has a crossroad with same incidence on the ends of the best candidate chain and the target polyline.

* * * * *